(12) United States Patent
Bach

(10) Patent No.: US 9,010,850 B2
(45) Date of Patent: Apr. 21, 2015

(54) WEATHERSTRIP FOR VEHICLE ROOF

(71) Applicant: Honda Motor Co., Ltd., Tokyo (JP)

(72) Inventor: Edward Bach, Galloway, OH (US)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 13/803,978

(22) Filed: Mar. 14, 2013

(65) Prior Publication Data

US 2014/0265454 A1 Sep. 18, 2014

(51) Int. Cl.
*B62D 25/06* (2006.01)
*B60J 10/00* (2006.01)
*B60J 10/08* (2006.01)

(52) U.S. Cl.
CPC .......... *B60J 10/0031* (2013.01); *B60J 10/0065* (2013.01); *B60J 10/0074* (2013.01); *B60J 10/081* (2013.01)

(58) Field of Classification Search
USPC .......... 296/210, 216.06, 222, 212, 146.8, 56, 296/146.9, 76; 49/483.1, 498.1
See application file for complete search history.

(56) References Cited

U.S. PATENT DOCUMENTS

| | | | |
|---|---|---|---|
| 6,520,563 B2 | 2/2003 | Nozaki | |
| 7,021,698 B2 * | 4/2006 | Yamada et al. | 296/146.8 |
| 7,360,825 B2 | 4/2008 | Yoshioka et al. | |
| 7,685,777 B2 * | 3/2010 | Nozaki et al. | 49/498.1 |
| 7,841,636 B2 | 11/2010 | Huth et al. | |
| 2002/0152688 A1 | 10/2002 | Dron | |
| 2011/0241370 A1 | 10/2011 | Alvarez et al. | |
| 2012/0031009 A1 | 2/2012 | Iwasa et al. | |

* cited by examiner

*Primary Examiner* — Joseph D Pape
*Assistant Examiner* — Dana Ivey
(74) *Attorney, Agent, or Firm* — Rankin, Hill & Clark LLP

(57) ABSTRACT

A weatherstrip is attached to a peripheral flange of a roof panel for sealing against a peripheral edge portion of a tailgate. The weatherstrip includes a base portion and is mounted to the roof panel by receiving the roof panel flange between an interior section and exterior section of the base portion. A tongue extends from the base portion toward the vehicle body and covers a space between the roof panel and the vehicle body. A generally tubular seal body extends from the base portion toward the peripheral edge portion of the tailgate. The seal body seals against the tailgate to prevent wind noise by closing a gap between a roof panel and tailgate. An arm extends from the base portion and is positioned between the roof panel and the vehicle body and is attached to an underside of the roof panel.

20 Claims, 5 Drawing Sheets

US 9,010,850 B2

WEATHERSTRIP FOR VEHICLE ROOF

BACKGROUND

Vehicle roofs are commonly fabricated of a stamped sheet metal outer panel attached to a vehicle body on all sides. If a steel roof panel is to be attached to a steel body, a series of resistance spot welds is typically used to attach the roof panel and body. More recently, with interest in reducing vehicle mass, consideration has been given to employing alternative materials for the vehicle roof panel such as plastic, aluminum or carbon fiber. When applying a roof panel to the steel body that is fabricated from these alternate materials, it cannot be attached in the traditional way. Instead, this alternative material roof panel is applied to the body by bonding, via an adhesive, the roof panel to the body. Because alternate materials can have forming limitations, there can be an exposed trim edge in a gutter area. It is also known to provide a weatherstrip or wind noise seal to a tailgate spoiler, and the steel roof panel forms the entire tailgate seal flange surface. However, most vehicle manufacturers are also trying to eliminate the spoiler to save cost. When applying a bonded roof panel together with a tailgate lacking the spoiler, there is no location to apply the seal between the roof panel and tailgate gap. Additionally, the exposed edge of the bonded roof panel needs to be covered for appearance.

BRIEF DESCRIPTION

In accordance with one aspect, a weatherstrip for a vehicle roof panel which is mounted to a vehicle body is provided. The weatherstrip is attached to a peripheral flange of the roof panel for sealing against a peripheral edge portion of a tailgate. The weatherstrip comprises a base portion having an interior section, and exterior section and an interconnecting section connecting the interior section and the exterior section. The weatherstrip is mounted to the roof panel by receiving the flange of the roof panel between the interior section and exterior section of the base portion. A tongue is connected to and extends from the base portion toward the vehicle body. The tongue covers a space between the roof panel and the vehicle body. A generally tubular seal body is connected to and extends from the base portion toward the peripheral edge portion of the tailgate. The seal body seals against the tailgate to prevent wind noise by closing a gap between the roof panel and tailgate. An arm is connected to and extends from the base portion. The arm is positioned between the roof panel and the vehicle body and is attached to an underside of the roof panel.

In accordance with another aspect, a weatherstrip is attached to a peripheral flange of the roof panel for sealing against a peripheral edge portion of a tailgate. The weatherstrip comprises a U-shaped base portion having an interior section, and exterior section and an interconnecting section connecting the interior section and the exterior section. The weatherstrip is mounted to the roof panel by receiving the flange of the roof panel between the interior section and exterior section of the base portion. A tongue extends from the interconnecting section of the base portion. The tongue closes a gap between the roof panel and a vehicle body. A generally tubular seal body extends from the exterior portion of the base portion. The seal body seals against the peripheral edge portion of the tailgate to prevent wind noise. An arm extends from interior section of the base portion. The arm is positioned between the roof panel and the vehicle body and includes a first portion adapted to receive an adhesive for adhering the arm to an underside of the roof panel.

In accordance with yet another aspect, a seal assembly for a vehicle comprises a vehicle body including a rear roof rail and a roof panel fixedly attached to the vehicle body. The roof panel includes a downwardly extending peripheral wall. A tailgate is mounted to the vehicle body. A peripheral edge portion of the tailgate is spaced from the wall of the roof panel. A weatherstrip is mounted to the wall of the roof panel. The weatherstrip includes a U-shaped base portion mounted to the wall of the roof panel. The base portion has an interior section, and exterior section and an interconnecting section connecting the interior section and the exterior section. A tongue extends from the interconnecting section of the base portion. The tongue closes a gap between the roof panel and the vehicle body. A generally tubular seal body extends from the exterior portion of the base portion and seals against the peripheral edge portion of the tailgate to prevent wind noise. An arm extends from the interior section of the base portion. The arm is positioned between the roof panel and the vehicle body and is secured to an underside of the roof panel. The arm defines a tear point which allows the base portion together with the seal body and tongue to be separated from the weatherstrip and removed from the roof panel while leaving the arm of the weatherstrip attached to the roof panel.

DETAILED DESCRIPTION

It should be understood that the description and drawings herein are merely illustrative and that various modifications and changes can be made in the structures disclosed without departing from the present disclosure. In general, the figures of the exemplary weatherstrip for a bonded roof panel are not to scale. As used herein, lateral directions are left and right directions across the vehicle and longitudinal directions are forward and rearward directions of vehicle travel. It will also be appreciated that the various identified components of the exemplary weatherstrip disclosed herein are merely terms of art that may vary from one manufacturer to another and should not be deemed to limit the present disclosure.

Figure 1:
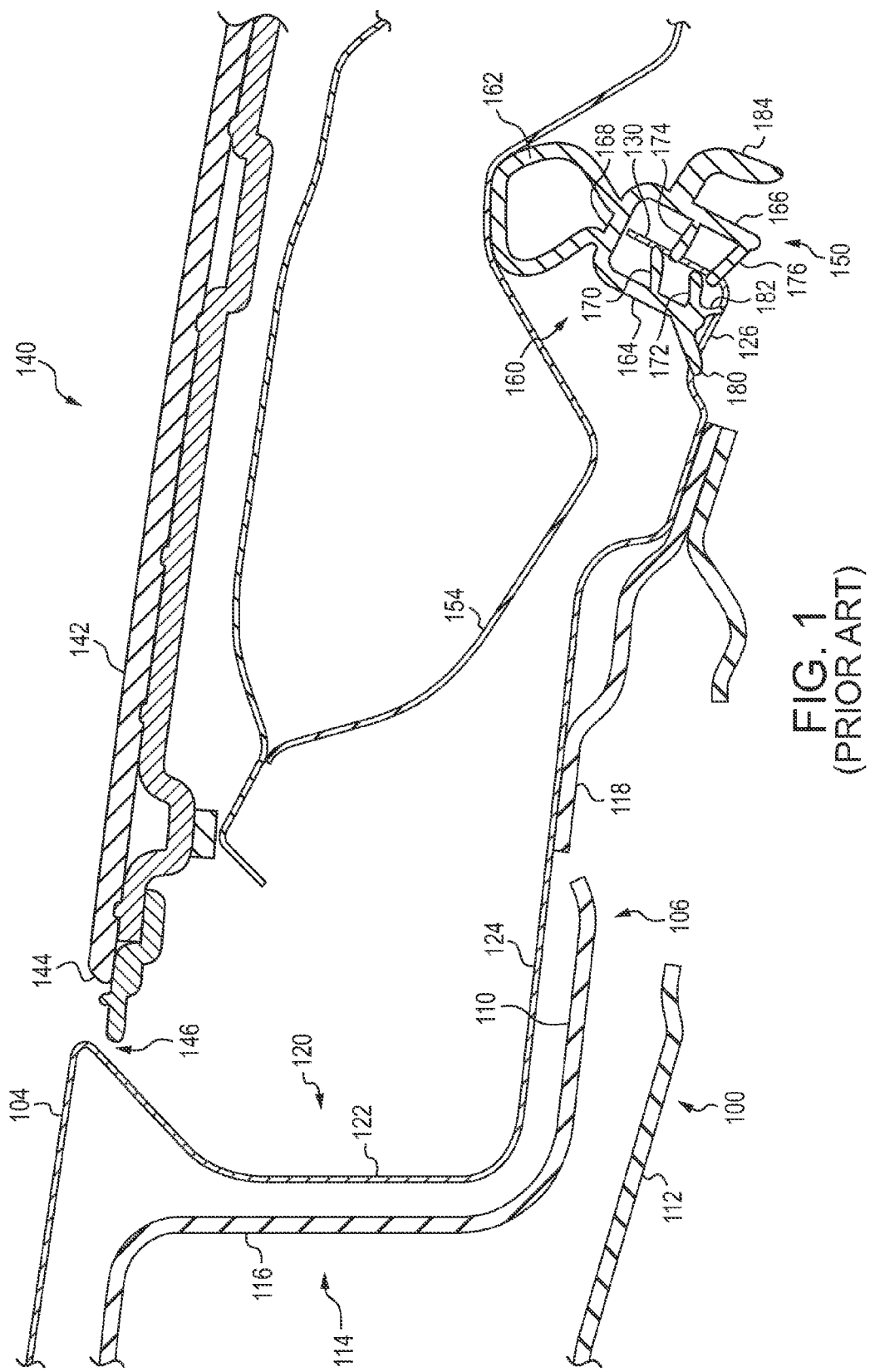
FIG. 1 is a cross-sectional view of a known construction for a steel vehicle body and a steel roof panel fixedly attached to the vehicle body. A known weatherstrip is mounted on a mounting flange of the roof panel for sealing against a tailgate.

Referring now to the drawings, wherein like numerals refer to like parts throughout the several views, FIG. 1 illustrates a known construction for a steel vehicle body 100 and a steel roof panel 104 fixedly attached to the vehicle body 100. The vehicle body 100 has a rear roof rail 106 including an outer panel 110 and an inner panel 112. The outer panel 110 has a flange structure 114 including a vertical wall 116 and a horizontal wall 118. Similarly, the roof panel 104 has a flange structure 120 including a vertical wall 122 and a horizontal wall 124. An end portion 126 of the horizontal wall 124 is folded upwardly to define a mounting flange 130. Located rearwardly of the roof panel 104 is a tailgate 140. The tailgate 140 is provided with a spoiler 142, and a peripheral edge portion 144 of the spoiler is spaced from the roof panel 104 so that a gap or opening 146 is provided between the roof panel 104 and the spoiler 142.

A weatherstrip or seal 150 of a known configuration seals the opening 146. The weatherstrip 150 is attached to the mounting flange 130 projecting from the roof panel 104 so as to face a rear panel 154 of the tailgate 140. The weatherstrip 150 has a trim portion 160 for attachment to the mounting flange 130, and a tubular seal portion 162 for contacting and sealing the rear panel 154 of the tailgate. The trim portion 160 includes an outer side wall 164, an inner side wall 166 and a bottom wall 168, and has a generally U-shaped cross-section. An insert or metal carrier (not shown) is embedded in the trim portion. Outer flange holding fingers or lips 170 and 172 and inner flange holding fingers or lips 174 and 176 respectively project obliquely from interior faces of the outer side wall 162 and the inner side wall 164 toward the bottom wall 166 in an interior space of the U-shaped trim portion 160. These flange holding lips hold and seal the mounting flange 130, thereby retaining the posture of the weatherstrip 150 and preventing the weatherstrip 150 from coming off the flange.

In the closed position of the tailgate 140, the tubular seal portion 162 contacts and seals the rear panel 154. In addition, a body seal lip 180 projects obliquely and downwardly from the outer side wall 162 and contacts the horizontal wall 124 of the roof panel 104. The body seal lip 180 prevents intrusion of rainwater, dirt, etc. into the vehicle compartment via the gap 146 between the roof panel 104 and tailgate 140. A sub-body seal lip 182 is formed so as to project downwardly from an inner face of the outer side wall 164. A cover lip 184 projects inwardly and downwardly from the inner side wall 166. The cover lip is arranged so as to cover ends of a garnish (not shown), panels (not shown), etc. provided in the vehicle compartment, whereby gaps between the weatherstrip 150, the garnish, the panels, etc. are sealed and covered to improve the appearance therearound.

As indicated previously, FIG. 1 depicts a known weatherstrip 150 mounted to the flange 130 of a steel roof panel 104 that is welded to the outer panel 110 and inner panel 112 of the steel vehicle body 102. However, when employing alternative materials for the vehicle roof panel, such as plastic, aluminum or carbon fiber, the alternate materials can have forming limitations. As such, the bonded roof panel cannot form the mounting flange for the weatherstrip. Further, when applying such a bonded roof panel together with a tailgate lacking the spoiler, there is no location to apply the weatherstrip between the roof panel and tailgate gap. Additionally, the exposed edge of the bonded roof panel needs to be covered for appearance.

Figure 2:
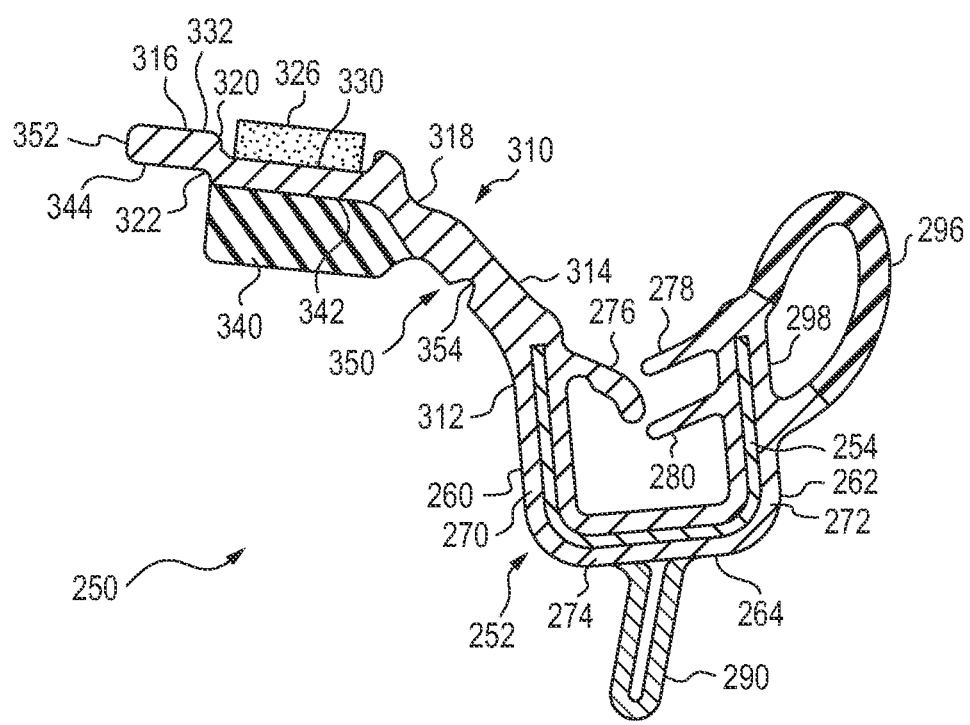
FIG. 2 is a cross-sectional view of a weatherstrip according to the present disclosure.
Figure 3:
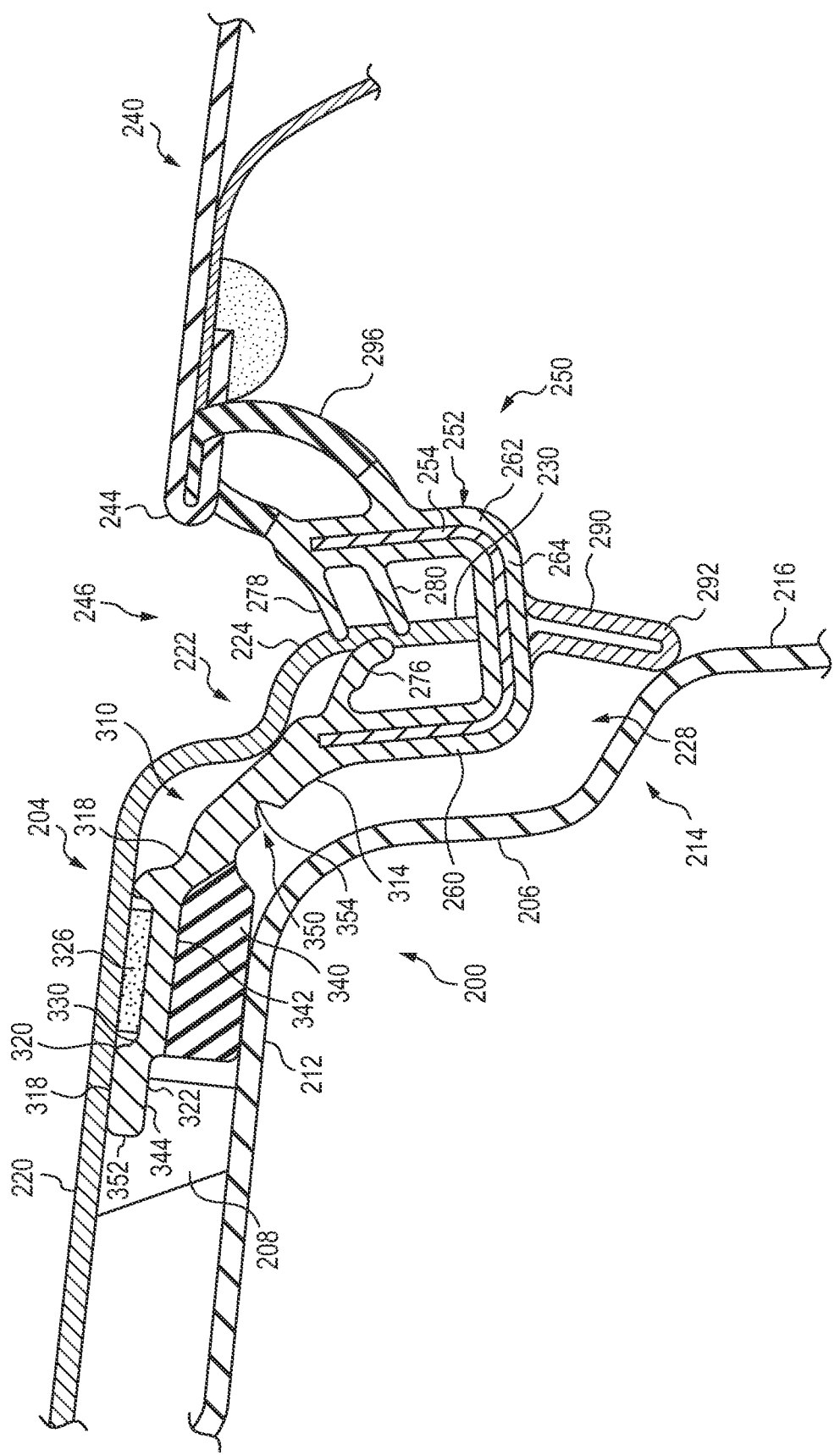
FIG. 3 is a cross-sectional view of the weatherstrip of FIG. 2 mounted to a flange of an alternative material roof panel that is bonded to a steel vehicle body.

With reference now to FIGS. 2 and 3, a vehicle roof panel 204 is mounted or bonded to a rear roof rail 206 of a vehicle body 200 via an adhesive 208. The roof panel 204 is manufactured from an alternative material such as plastic, aluminum or carbon fiber. The rear roof rail 206 includes a base portion 212 and a flange structure 214 extending from the base portion 212. The flange structure 214 has a vertical wall 216 and a horizontal wall 218 (see FIG. 5). The roof panel 204 also includes a base portion 220 and a flange structure 222 extending downwardly from the base portion 220. However, unlike the flange structure 120 of the steel roof panel 104, the flange structure 222 only includes a vertical wall 224, which at least partially defines a peripheral flange of the roof panel. As shown, the vertical wall 224 is offset rearwardly of the vertical wall 216 and is sized smaller than the vertical wall 216 so as to define a gap or opening 228 between a distal end 230 of the vertical wall 224 and the vertical wall 216 of the rear roof rail 206. Located rearwardly of the roof panel 204 is a tailgate 240. A peripheral edge portion 244 of the tailgate 240 is spaced from the roof panel 204 so that a gap or opening 246 is provided between the roof panel 204 and the tailgate 240.

A weatherstrip 250 (also commonly referred to as a weatherseal or seal) according to the present disclosure is attached to the peripheral flange 224 of the roof panel 204 for sealing against the peripheral edge portion 244 of the tailgate 240. The weatherstrip generally comprises a trim portion or base portion 252. The base portion 252 can be an elastomer or rubber-like material that is extruded on an elongate insert or carrier 254 and has a generally U-shaped configuration in cross-section (taken normal to the lateral direction). The carrier 254 can strengthen the holding force of the base portion 252 against peripheral flange 224. The carrier can be formed of metal or a hard synthetic resin. Where the base portion is composed of a hard elastomer or rubber-like material the carrier 254 can be omitted. The base section 252 includes an interior section 260, and exterior section 262 and an interconnecting section 264 connecting the interior section and the exterior section. The interior section 260 includes an inner side wall 270, the exterior section 262 includes an outer side wall 272 and the interconnecting section 264 includes a bottom wall 274.

An inner flange holding finger or lip 276 and outer flange holding fingers or lips 278, 280 respectively project obliquely and downwardly from interior faces of the inner side wall 270 and outer side wall 272 toward the bottom wall 274 in an interior space of the base portion 252. The inner lip 276 and outer lips 278, 280 can extend along the length of the weatherstrip 250. The weatherstrip 250 is mounted to the roof panel 204 by receiving the flange 224 of the roof panel downwardly between the interior section 260 and exterior section 262 of the base portion. The holding inner and outer lips hold and seal the peripheral flange 224 of the roof panel 204, thereby retaining the posture of the weatherstrip 250 and preventing the weatherstrip 250 from coming off the flange 224. It should be appreciated that the base portion 252 may only have the exterior section 262 and interconnecting section 264 to define a generally inverted L-shaped cross-section. In this case, the base portion 252 can be attached to the peripheral flange 224 with a double-sided adhesive tape that is bonded to the interior face of the outer side wall 272.

As depicted in FIGS. 2 and 3, the exemplary weatherstrip 250 further includes a cover lip or tongue 290 which is connected to and extends from the base portion 252 toward the vehicle body 200. As indicated previously, because the alternative material roof panel 204 can have forming limitations not allowing a tailgate seal flange to be stamped in the roof panel, the gap or space 228 is created between the roof panel and the vehicle body. The tongue 290 closes or covers the space 228 between the roof panel 204 and the vehicle body. Particularly, the tongue 290 extends downwardly from the bottom wall 274 of the interconnecting section 264 and slightly inwardly toward the flange structure 214 of the vehicle body 200. A distal end 292 of the tongue engages the vertical wall 216 which prevents intrusion of rainwater, dirt, etc. between the vehicle body 200 and roof panel 204. The tongue can be formed of an elastomer or rubber-like material and can be integrally formed with the interconnected portion 264. It should be appreciated that tongue 290 exhibits improved flexibility allowing the tongue to conform to variations in the gap 228 between the weatherstrip 250 and vehicle body 200 so that the tongue maintains contact with the vehicle body, thereby ensuring good sealing properties thereagainst.

A generally tubular seal body 296 is connected to and extends from the base portion 252 toward the peripheral edge portion 244 of the tailgate 240. The seal body 296 seals against the tailgate 240 to prevent wind noise by closing the gap 246 between the roof panel 204 and tailgate. As shown, the seal body 296 can be integrally formed on an exterior face of outer side wall 272 of the exterior section 262 of the base portion 252 and extends obliquely and upwardly away from an upper end 298 of the outer side wall 272. The seal body 296 can be made of a sponge material, such as a foamed rubber, to accommodate the variances in the tailgate positional accuracy and can be formed at the same time with the base portion 252 and tongue 290 during an extrusion molding method.

The exemplary weatherstrip 250 further includes an arm 310 connected to and extending from the base portion 252. As illustrated in FIG. 3, the arm 310 extends obliquely and upwardly away from an upper end 312 of the inner side wall 270 of the interior section 260 and is positioned between the roof panel 204 and the vehicle body 200 and is attached to an underside of the base portion 220 of the roof panel. As indicated previously, the roof panel is attached to the vehicle body via the adhesive 208, and the adhesive is spaced forwardly of an end portion of the arm. The arm 310 is defined by a first section 314 and a second section 316. The first section 314 extends from the inner side wall 270 and the second section 316 extends angularly from the first section. A connecting portion 318 between the first and second sections 314, 316 has a reduced dimension (i.e., a reduced thickness) as compared the respective dimensions of the first and second sections. This allows the second section 316 to flex or move relative to the first section 314 thereby ensuring proper positioning of the second section relative to the base portion 220 of the roof panel 204.

The second section 316 of the arm 310 includes a first portion 320 facing the underside of the base portion 220 of the roof panel and a second portion 322 facing the base portion 212 of the rear roof rail 206 of the vehicle body 200. The first portion 320 is adapted to receive an adhesive, such as a double-sided adhesive tape 326, for attaching the arm 310 to the underside of the roof panel. Particularly, the first portion 320 can be defined by a channel 330 formed in an upper surface 332 of the second section 316 of the arm. The first channel 330 can extend along the length of the weatherstrip 250 and has a predetermined depth for the adhesive such that in the installed condition of the weatherstrip, the upper surface 332 is in contact with the underside of the base portion 212. The second portion 322 of the arm is adapted to receive a spacer 340 which is positioned between the arm and the rear roof rail 206 and spaces the arm a predetermined distance from the rear roof rail. The second portion 322 can be defined a platform 342 formed on a lower surface 344 of the second section 322 of the arm.

Figure 4:
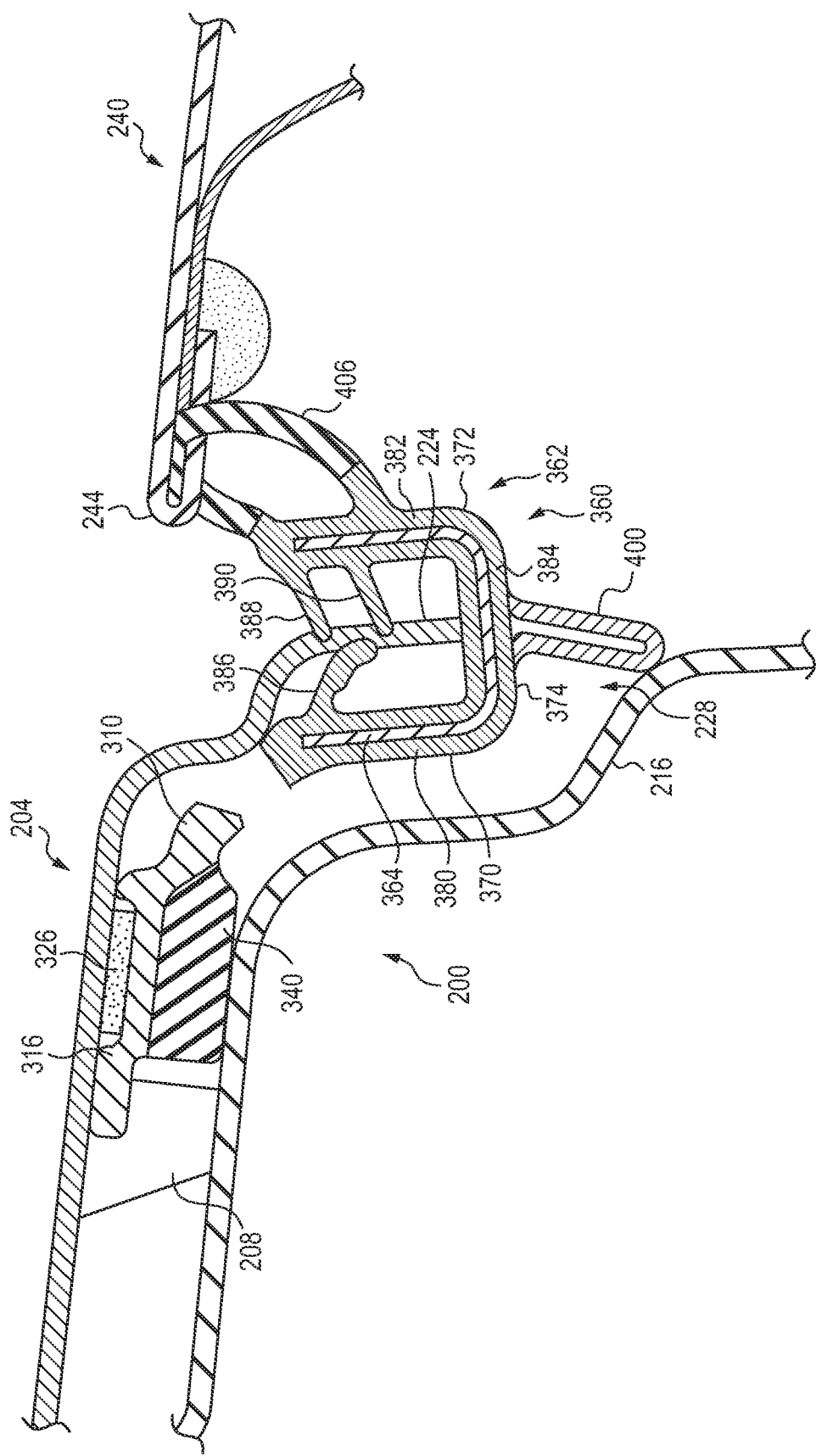
FIG. 4 is a cross-sectional view of the weatherstrip of FIG. 3 having a portion thereof replaced.

With particular reference to FIGS. 3 and 4, the arm 310 further defines a tear point 350 positioned between an end portion 352 of the arm and the base portion 252. The tear point allows one part of the arm 310 to be separated from the weatherstrip 250 and removed from the roof panel 204 while leaving another part the arm 310 of the weatherstrip 250 attached to the roof panel. The tear point 350 can be defined by a groove 354 provided in a lower surface of the first section 314 of the arm. The groove 354 extends laterally on the arm 310 such that the groove extends along the length of the peripheral flange 224. The groove 354 is positioned between the adhesive 326 adhered to the first portion 320 of the second section 316 and the base portion 252. In order to service the weatherstrip 250 in case of damage without replacing the entire roof panel 204, the tear point would allow the base portion 252 together with the tongue 290 and seal body 296 to be removed from the roof panel while leaving the spacer 240 still attached to the second section 316 of the arm 310 (which is adhered to the roof panel via the adhesive 326) without damaging the roof panel 204 or vehicle body 200. A service seal 360 then installed on the peripheral flange 224 of the roof panel 204.

As depicted in FIG. 4, the service seal 360 is similar to the weatherstrip 250 (except for the arm 310) and includes a generally U-shaped trim portion or base portion 362. An elongate insert or carrier 364 is embedded base portion 362. The base section 362 includes an interior section 370, and exterior section 372 and an interconnecting section 374 connecting the interior section and the exterior section. The interior section 370 includes an inner side wall 380, the exterior section 372 includes an outer side wall 382 and the interconnecting section 374 includes a bottom wall 384. An inner flange holding finger or lip 386 and outer flange holding fingers or lips 388, 390 respectively project obliquely and downwardly from interior faces of the inner side wall 380 and outer side wall 382 toward the bottom wall 384 in an interior space of the base portion 362. The holding inner and outer lips hold and seal the peripheral flange 224 of the roof panel 204, thereby retaining the posture of the service seal 360 and preventing the service seal 360 from coming off the flange 224. The service seal 360 further includes a cover lip or tongue 400 which is connected to and extends from the base portion 352 toward the vehicle body 200. The tongue 400 closes or covers the space 228 between the roof panel 204 and the vehicle body. A generally tubular seal body 406 is connected to and extends from the base portion 362 toward the peripheral edge portion 244 of the tailgate 240. The seal body 406 seals against the tailgate 240 to prevent wind noise by closing the gap 246 between the roof panel 204 and tailgate.

Figure 5:
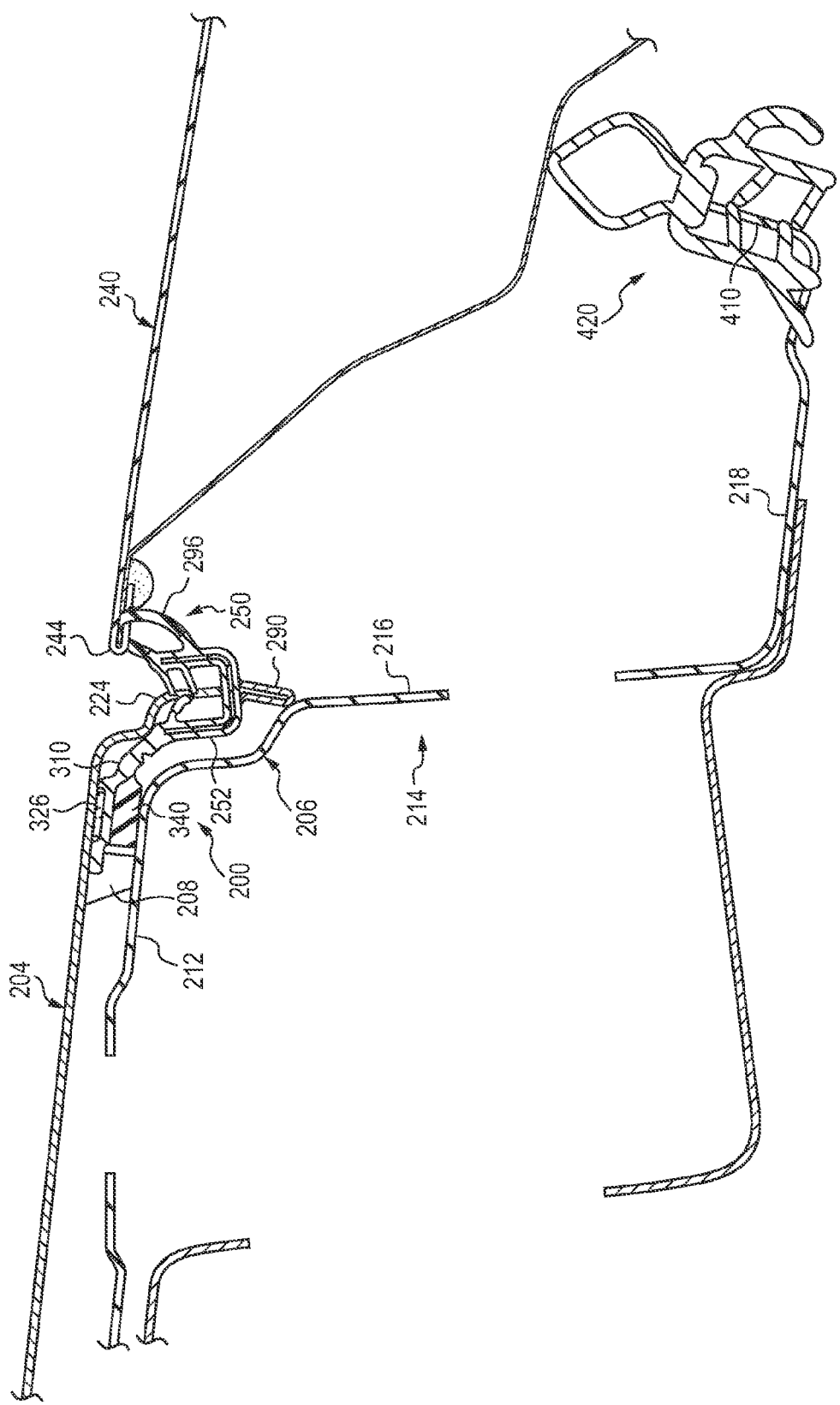
FIG. 5 is a cross-sectional view of a seal assembly for the bonded roof panel and vehicle body of FIG. 3, the seal assembly including the weatherstrip of FIG. 2 and a secondary weatherstrip mounted to a flange of the vehicle body.

FIG. 5 depicts a seal assembly for a vehicle having the vehicle body 200 including the rear roof rail 206 and the roof panel 204 bonded to the rear roof rail. The spacer 340 is positioned between the arm 310 of the weatherstrip 250 and the rear roof rail 206 for spacing the arm a predetermined distance from the rear roof rail. The weatherstrip 250 is adhered to the roof panel 204 and then mounted to the vertical wall or peripheral flange 224 of the roof panel in the manner indicated above. The rear roof rail 206 includes the flange structure 214 having the vertical wall 216 and horizontal wall 218. An end portion of the horizontal wall 218 defines a mounting flange 410 which is located rearwardly of the peripheral edge portion 244 of the tailgate 240 (thus, the flange 224 of the roof panel is spaced forwardly from the flange 410 of the rear roof rail). A second weatherstrip 420 is mounted to the rear roof rail flange 410. The second weatherstrip 420 has a configuration similar to the weatherstrip 150, and, therefore, further description of the second weatherstrip is omitted for conciseness. The second weatherstrip 410 is adapted to seal against an underside of the tailgate 240.

As is evident form the foregoing, the exemplary weatherstrip 250 can serve three functions: reduce wind noise, enhance appearance, and provided spacing for bonding. During assembly, the weatherstrip 250 can be attached to the roof panel 204 before the roof panel is bonded to the vehicle body 200 after paint. The base portion 252 of the weatherstrip 250 is fit onto the roof flange 224 and then adhered to the bottom of the roof panel 204 via the adhesive 326 to control the location before the roof panel is bonded to the vehicle body. The holding fingers of lips 276, 278, 280 provide resistance for trying to remove the weatherstrip 250 from the roof panel.

The adhesive 208 is applied to the roof panel 204 with the weatherstrip 250 attached, and then the roof panel 204 is bonded to the vehicle body. To achieve desired wind noise performance without a wind noise seal on the tailgate spoiler, the weatherstrip 250 includes the seal body 296. The seal body 296 can be composed of a sponge material and is used to seal against the tailgate 240 to prevent wind noise by closing the gap 246 between the roof panel 204 and tailgate.

As indicated above, the alternative material roof panel 204 can have forming limitations which prevent the formation of a tailgate seal flange. This creates the gap 228 between the roof panel and the vehicle body. The appearance lip or tongue 290 is provided to close the gap 228 between the roof panel 204 and the vehicle body 200. Because the alternative material roof panel is bonded to the vehicle body, the rear seal also has the spacer 340 to control the bonding height of the roof panel for performance and appearance. In order to service the weatherstrip 250 in case of damage with out replacing the entire roof panel, the tear point 350 is provided on the arm 310 which allows a part of the weatherstrip 250 to be removed from the roof panel 204 leaving the remainder of the weatherstrip 250 including the spacer 340 still attached without damaging the roof panel 204 or vehicle body 200. The service seal 360 can then be mounted to the flange 224 of the roof panel 204.

It will be appreciated that various of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

What is claimed is:

1. A weatherstrip for a vehicle roof panel which is mounted to a vehicle body, the weatherstrip is attached to a peripheral flange of the roof panel for sealing against a peripheral edge portion of a tailgate, the weatherstrip comprising:
   a base portion having an interior section, and exterior section and an interconnecting section connecting the interior section and the exterior section, the weatherstrip is mounted to the vehicle roof panel by receiving the peripheral flange of the vehicle roof panel between the interior section and exterior section of the base portion;
   a tongue connected to and extending from the base portion toward the vehicle body, the tongue covers a space between the vehicle roof panel and the vehicle body;
   a generally tubular seal body connected to and extending from the base portion toward the peripheral edge portion of the tailgate, the generally tubular seal body seals against the tailgate closing a gap between the vehicle roof panel and tailgate; and
   an arm connected to and extending from the base portion, the arm is positioned between the vehicle roof panel and the vehicle body and is attached to an underside of the vehicle roof panel.

2. The weatherstrip of claim 1, wherein the arm includes a first portion facing the roof panel and adapted to receive an adhesive for attaching the arm to the underside of the roof panel.

3. The weatherstrip of claim 2, wherein the arm includes a second portion facing the vehicle body and adapted to receive a spacer for spacing the arm a predetermined distance from the vehicle body.

4. The weatherstrip of claim 3, wherein the first portion is defined by a channel formed in an upper surface of the arm, and the second portion is defined a platform formed on a lower surface of the arm.

5. The weatherstrip of claim 1, wherein the arm defines a tear point positioned between an end portion of the arm and the base portion, the tear point allows the base portion together with the generally tubular seal body and tongue to be separated from the weatherstrip and removed from the vehicle roof panel while leaving a portion of the arm of the weatherstrip attached to the vehicle roof panel.

6. The weatherstrip of claim 5, wherein the tear point is defined by a laterally extending groove provided in a lower surface of the arm.

7. The weatherstrip of claim 1, wherein the seal body extends away from an upper end of the exterior section of the base portion.

8. The weatherstrip of claim 7, wherein the tongue extends away from the interconnecting section of the base portion and engages the vehicle body.

9. The weatherstrip of claim 8, wherein the arm extends away from an upper end of the interior section of the base portion.

10. The weatherstrip of claim 1, wherein the base portion is U-shaped in cross-section and the peripheral flange of the vehicle roof panel extends downwardly into the base portion.

11. The weatherstrip of claim 1 in combination with the vehicle roof panel and vehicle body, the vehicle body includes a rear roof rail having a flange, and the peripheral flange of the vehicle roof panel which is received in the base portion of the weatherstrip is spaced forwardly from the flange of the rear roof rail.

12. The combination of claim 11, further including a second weatherstrip connected to the flange of the rear roof rail, the second weatherstrip having a generally tubular seal body for sealing against an underside of the tailgate.

13. A weatherstrip for a vehicle roof panel which is mounted to a vehicle body, the weatherstrip is attached to a peripheral flange of the roof panel for sealing against a peripheral edge portion of a tailgate, the weatherstrip comprising:
   a U-shaped base portion having an interior section, and exterior section and an interconnecting section connecting the interior section and the exterior section, the weatherstrip is mounted to the vehicle roof panel by receiving the peripheral flange of the vehicle roof panel between the interior section and exterior section of the U-shaped base portion;
   a tongue extending from the interconnecting section of the U-shaped base portion, the tongue closes a gap between the vehicle roof panel and the vehicle body;
   a generally tubular seal body extending from the exterior portion of the U-shaped base portion, the generally tubular seal body seals against the peripheral edge portion of the tailgate; and
   an arm extending from interior section of the U-shaped base portion, the arm is positioned between the vehicle roof panel and the vehicle body, the arm includes a first portion adapted to receive an adhesive for adhering the arm to an underside of the vehicle roof panel.

14. The weatherstrip of claim 13, wherein the arm includes a second portion, and further including a spacer received in the second portion for spacing the arm a predetermined distance from the vehicle body.

15. The weatherstrip of claim 13, wherein the arm includes a laterally extending groove positioned between the first portion of the arm and the U-shaped base portion, the groove defines a tear point which allows the U-shaped base portion together with the generally tubular seal body and tongue to be separated from the weatherstrip and removed from the vehicle roof panel while leaving the arm of the weatherstrip attached to the vehicle roof panel.

16. A seal assembly for a vehicle comprising:
a vehicle body including a rear roof rail;
a roof panel fixedly attached to the vehicle body, the roof panel includes a downwardly extending peripheral wall;
a tailgate mounted to the vehicle body, a peripheral edge portion of the tailgate is spaced from the peripheral wall of the roof panel; and
a weatherstrip mounted to the wall of the roof panel; the weatherstrip includes:
a U-shaped base portion mounted to the peripheral wall of the roof panel, the U-shaped base portion has an interior section, an exterior section and an interconnecting section connecting the interior section and the exterior section;
a tongue extending from the interconnecting section of the U-shaped base portion, the tongue closes a gap between the roof panel and the vehicle body;
a generally tubular seal body extending from the exterior portion of the U-shaped base portion, the generally tubular seal body seals against the peripheral edge portion of the tailgate; and
an arm extending from the interior section of the U-shaped base portion, the arm is positioned between the roof panel and the vehicle body and is secured to an underside of the roof panel, the arm defines a tear point which allows the U-shaped base portion together with the generally tubular seal body and tongue to be separated from the weatherstrip and removed from the roof panel while leaving the arm of the weatherstrip attached to the roof panel.

17. The seal assembly of claim 16, further including a spacer positioned between the arm and the rear roof rail for spacing the arm a predetermined distance from the rear roof rail.

18. The seal assembly of claim 16, wherein the arm includes a channel adapted to receive an adhesive for attaching the arm to the underside of the roof panel.

19. The seal assembly of claim 16, wherein the rear roof rail including a flange located rearwardly of the peripheral edge portion of the tailgate, and further including a second weatherstrip mounted to the rear roof rail flange, the second weatherstrip includes a seal body for sealing against an underside of the tailgate.

20. The seal assembly of claim 16, wherein the roof panel is manufactured from one of plastic, aluminum and carbon fiber, the roof panel is attached to the vehicle body via an adhesive which is spaced forwardly of an end portion of the arm.

* * * * *